(12) United States Patent
Lundaas

(10) Patent No.: US 6,460,375 B1
(45) Date of Patent: Oct. 8, 2002

(54) ICE COATING METHOD FOR CONTROLLING THE FORMATION OF AN ICE-COATING ON THE EXTERIOR OF A HOLLOW GLASS ARTICLE

(76) Inventor: Terje Lundaas, 7003 N. Waterway Dr., #201, Miami, FL (US) 33155

( * ) Notice: Subject to any disclaimer, the term of this patent is extended or adjusted under 35 U.S.C. 154(b) by 0 days.

(21) Appl. No.: 09/499,998

(22) Filed: Feb. 8, 2000

(51) Int. Cl.[7] ............................................. C03C 17/00
(52) U.S. Cl. .................... 65/29.19; 65/60.1; 65/162; 65/348; 62/66; 62/340; 118/666; 118/69; 427/8; 427/255.11
(58) Field of Search ................ 65/60.1, 68, 29.19, 65/162, 108, 348; 427/8, 255.11; 118/666, 58, 69; 165/58, 61, 62, 63; D23/314, 328; 62/6, 66, 80, 81, 118, 140, 156, 159, 160, 340

(56) References Cited

U.S. PATENT DOCUMENTS

| | | | |
|---|---|---|---|
| 1,763,071 A | * 6/1930 | Smalley | 29/428 |
| 1,923,148 A | * 8/1933 | Hotchner | 174/50.5 |
| 2,064,039 A | * 12/1936 | Shively et al. | 65/108 |
| 2,959,940 A | * 11/1960 | McDonald | 62/458 |
| 2,959,942 A | * 11/1960 | McDonald | 62/526 |
| 3,328,974 A | * 7/1967 | Matsushita | 62/246 |
| 4,297,120 A | * 10/1981 | Smith et al. | 65/281 |
| 4,351,157 A | * 9/1982 | Zeigler | 62/1 |
| 4,608,836 A | * 9/1986 | MacCracken et al. | 62/325 |
| 5,018,360 A | * 5/1991 | Jones | 62/66 |
| 6,205,800 B1 | * 3/2001 | Topper et al. | 62/156 |

FOREIGN PATENT DOCUMENTS

DE 4107943 A1 * 9/1992

* cited by examiner

*Primary Examiner*—Sean Vincent
(74) *Attorney, Agent, or Firm*—Gold & Rizvi, P.A.; Glenn E. Gold; H. John Rizvi

(57) ABSTRACT

A system is provided for forming an ice coating on the outer surface of blown glass tube-shaped glass pieces (30) of an art work. The blown glass tubes are attached to a support surface (36) such that opposing ends of each glass tube are positioned over apertures in the surface. Liquid coolant contained in a thermally insulated tank (10) is cooled by a compressor (12) and then forced through an inlet manifold subassembly (20, 24) into the glass tubes, and then returned through a return manifold subassembly (40,44) to the tank for re-circulation. The continuous flow of liquid coolant results in the formation of an ice coating on the outer surface of the blown glass tubes.

13 Claims, 2 Drawing Sheets

US 6,460,375 B1

ICE COATING METHOD FOR CONTROLLING THE FORMATION OF AN ICE-COATING ON THE EXTERIOR OF A HOLLOW GLASS ARTICLE

FIELD OF THE INVENTION

This invention relates generally to the art of producing blown glass articles, and more particularly to a system and method for controlling the formation of an ice coating on the outer surface of such articles.

BACKGROUND OF THE INVENTION

The art of glass blowing is well known, it has been practiced throughout the world for centuries. Present day glassblowers manipulate hot, malleable glass by using similar skills and techniques as those used by Egyptian craftsmen of ancient times. In the hands of an experienced glassblower, glass can be manipulated into a virtually endless variety of geometries and sizes. Glass blowing is commonly used to create artistic glass works for both private and public display. There is great demand in the marketplace for such works.

Artists create visually appealing blown glass works by manipulating the physical characteristics of the glass work. Primarily, visual variations from piece to piece are limited to differences in geometric configurations, color combinations, and surface characteristics of the individual glass components of the work. Those skilled in the art of creating blown glass works are constantly looking for ways to further enhance the creativity of their works. Accordingly, novel ways of enhancing the visual appeal of artistic glass works are desirable.

SUMMARY OF THE INVENTION

It is an object of the present invention to provide a system and method for manipulating the visual appearance of a hollow glass article by controlling the temperature of a fluid communicated therethrough.

It is another object of the present invention to provide a system and method for forming an ice coating on the outer surface of a hollow glass article in an above-freezing temperature ambient condition.

It is still another object of the present invention to provide a system and method for preventing the formation of an ice coating on the outer surface of a hollow glass article in a below-freezing temperature ambient condition.

These and other objects are achieved with the present invention in which a system and method are provided for controlling the formation an ice coating on the exterior of hollow glass members 30 of an artwork. The individual glass members 30 are preferably blown from molten glass to create a plurality of unique tubular geometries having a variety of colors.

The glass members 30 have opposite open ends, each terminating at a planar edge 31 defining an opening 33. The opposite ends of each glass tube are attached to a support structure 34 preferably having a planar upper surface 36 surrounded by a raised peripheral portion 38. Planar edge 31 of tubular glass member 30 is preferably attached to surface 36 with a layer of adhesive 32, providing an air-tight waterproof seal between glass member edge 31 and support surface 36.

The ends of each glass tube 30 are positioned over apertures 37 extending completely through support structure upper surface 36. Connector members 26 are provided for transferring liquid coolant between the glass members 30 and other components of the system. In the preferred embodiment of the present invention, each connector 26 has upper and lower conduit portions, 27 and 29, respectively, separated by a flanged portion 28 extending outwardly from the exterior surface of the connector.

An insulated reservoir 10 is provided for holding a volume of liquid coolant to be circulated through the system. In operation, the temperature of the liquid coolant can be reduced to a desired temperature range using a compressor apparatus 12 similar to that employed in automobile air conditioning systems and refrigeration systems. As illustrated in FIG. 4, in the present invention, compressed refrigerant is circulated through a length of copper tubing 14 which includes a coiled section extending proximate to the bottom of coolant reservoir 10. A pump 18 is provided for circulating the coolant through the system during operation.

A conduit subassembly is provided for directing the flow of coolant through the system. Generally, the conduit subassembly includes an inlet manifold 20, a plurality of inlet conduit members 24, an outlet manifold 44, and a plurality of outlet conduit members 40. Inlet manifold 20 includes a plurality of integral manifold ports 22 fluidly connected to inlet conduit members 24. Preferably, inlet conduit members 24 comprise lengths of flexible plastic tubing capable of circulating coolant at the desired temperature ranges without degrading. Opposite ends of each inlet conduit member 24 fit snugly over integral port 22 and fluid connector portion 29, respectively. Outlet manifold member 44 has a similar construction to inlet manifold member 20 and includes a plurality of integral outlet ports 42 attached by outlet conduit members 40 to corresponding fluid connectors as previously described above. Preferably, the outlet conduit members 40 are provided having a smaller inner diameter than the respective inlet conduit members 24 in order to impede the flow of coolant through the glass tubes, thereby ensuring that the glass tubes are maintained continuously filled with coolant during operation. In this manner, the formation of bare spots, or external tube surface areas not coated with ice, can be minimized. Outlet manifold member 44 also has an integral return port 46 through which the coolant is returned to coolant reservoir 10. As illustrated in FIGS. 1 and 4, return port 46 introduces circulated coolant back to the surface of the coolant volume in reservoir 10.

In an alternate embodiment of the present invention, a thermocouple apparatus extends through reservoir 10 for measuring coolant temperature. More specifically, the thermocouple includes a temperature sensor 17 and a temperature display 19. Preferably, the thermocouple communicates electronically with the compressor subsystem in such a manner that operation of the compressor can be regulated to maintain the coolant temperature within a desired range.

In operation, the compressor apparatus 12 reduces the temperature of liquid coolant in the reservoir 10 to a desired temperature. Once the desired coolant temperature has been achieved, coolant is pumped out of reservoir 10 and into inlet manifold 20. Subsequently, the coolant is forced through integral manifold ports 22 and directed into corresponding glass members 30. Upon exiting the glass members, coolant is recombined in outlet manifold 44, where it is returned into reservoir 10 through outlet port 46. Preferably, the system is operated in an environment having a high ambient temperature relative to the coolant temperature. As a result, condensate is initially formed on the outer surface of the glass tubes, ultimately freezing to form the desired ice coating.

Alternatively, in some instances it may be desirable to prevent the formation an ice coating on the exterior surface of glass members 30 in below-freezing temperature ambient conditions. In that instance, coolant is preferably circulated through the system at a temperature sufficient to preclude the formation of an ice coating.

DETAILED DESCRIPTION OF THE PREFERRED EMBODIMENTS

Figure 1:
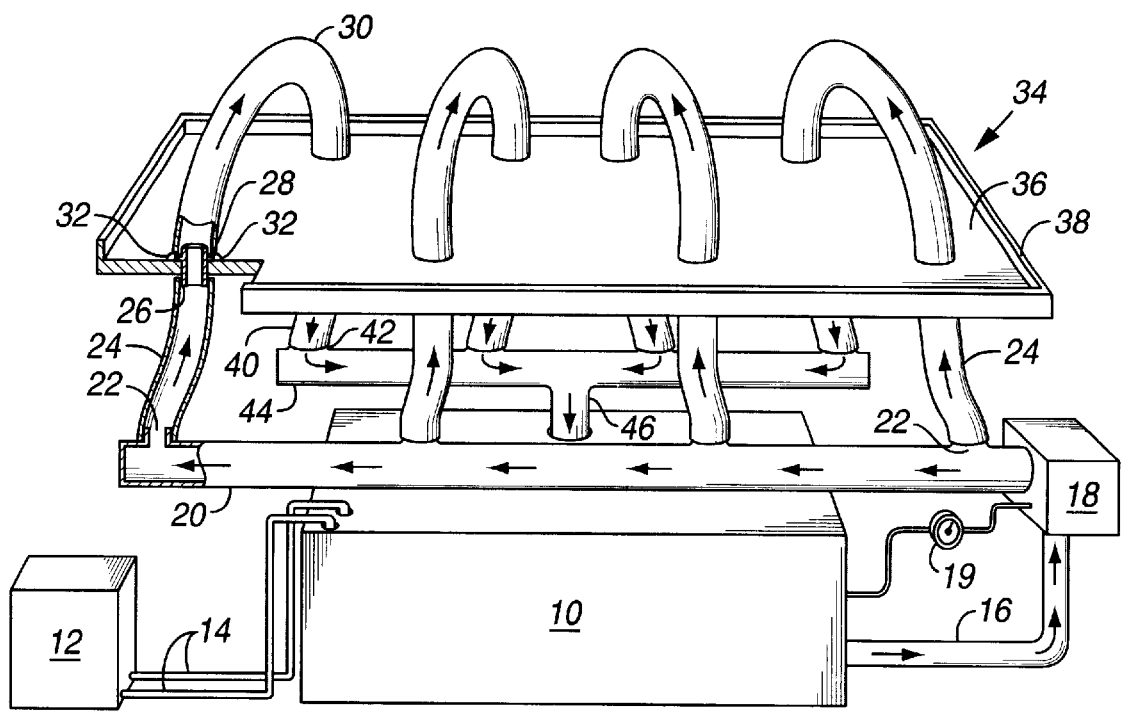
FIG. 1 a perspective view, partially cutaway, of a system for forming an ice coating on glass articles, in accordance with the present invention.
Figure 2:
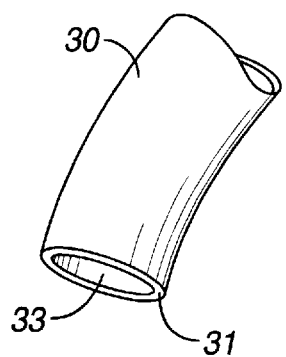
FIG. 2 is a perspective view of an end of a glass member of the present invention.

Referring now to FIGS. 1–4, a system is provided for controlling the formation of an ice coating on the exterior of tubular glass members 30 of an artwork. More specifically, the system provides a means for communicating a temperature-controlled fluid through the glass members to either effect the formation of an ice coating or, alternatively, to prevent the formation of an ice coating. In the preferred embodiment of the invention, the temperature-controlled fluid comprises liquid coolant. The individual tubular glass members 30 are preferably blown from molten glass to create a plurality of unique tubular geometries having a variety of colors. Applying the art of glass blowing to form such colored tubular members is well known. Accordingly, further description of the glass blowing process is not necessary to practice the invention and is not provided.

The glass members 30 have opposite open ends, each terminating at a planar edge 31 defining an opening 33. The opposite ends of each glass tube are attached to a support structure 34. In the preferred embodiment of the invention, the support structure has a planar upper surface 36 surrounded by a raised peripheral portion 38. The support structure can be constructed from a variety of different materials including, but not limited to, wood, glass, plastic and metal. However, it is preferred that the support structure is constructed from a translucent material, such as glass, to enable the transmission of light emitted from a light source (not shown) through upper surface 36. Planar edge 31 of tubular glass member 30 is preferably attached to surface 36 with a layer of adhesive 32. It will be apparent to those skilled in the art that there are a variety of commercially-available adhesives that can be used for attaching the tubular glass members 30 to the upper surface 36 of support structure 34. The adhesive should provide an air-tight, waterproof seal between glass member edge 31 and support surface 36. Furthermore, the adhesive should be able to withstand the temperature extremes to which the glass tubes are subjected without degrading the efficacy of the seal. For instance, I have found success employing an ultraviolet (UV) curable epoxy sold under the trade name LUCTITE 349, manufactured by the Luctite Corporation of Rocky Hill, Conn.

Figure 3:
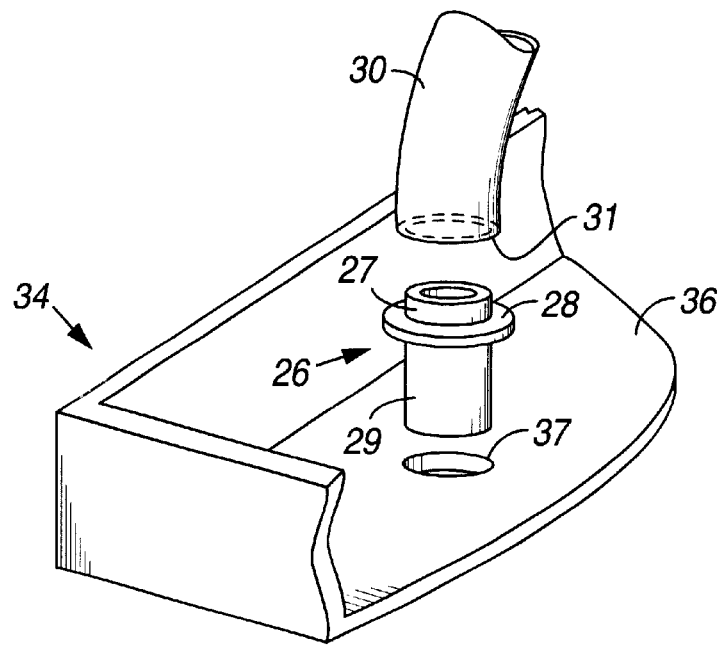
FIG. 3 is an exploded view at a one end of a glass article of the present invention, further illustrating the preferred assembly of the glass article and connector member to the support structure.

As illustrated in FIG. 3, the ends of each glass tube 30 are positioned over apertures 37 extending completely through support structure upper surface 36. Connector members 26 are provided for transferring liquid coolant between the glass members 30 and other elements of the system (described below). It will be apparent to those skilled in the art that various types of fluid connectors could be employed. In the preferred embodiment of the present invention, each connector 26 has upper and lower conduit portions, 27 and 29, respectively, separated by an outwardly extending flanged portion 28. As assembled, the flanged portion 28 is preferably attached to upper surface 36 of support structure 34 using an adhesive. Alternatively, attachment of the connector to the support structure could be accomplished using conventional mechanical fastening means.

Figure 4:
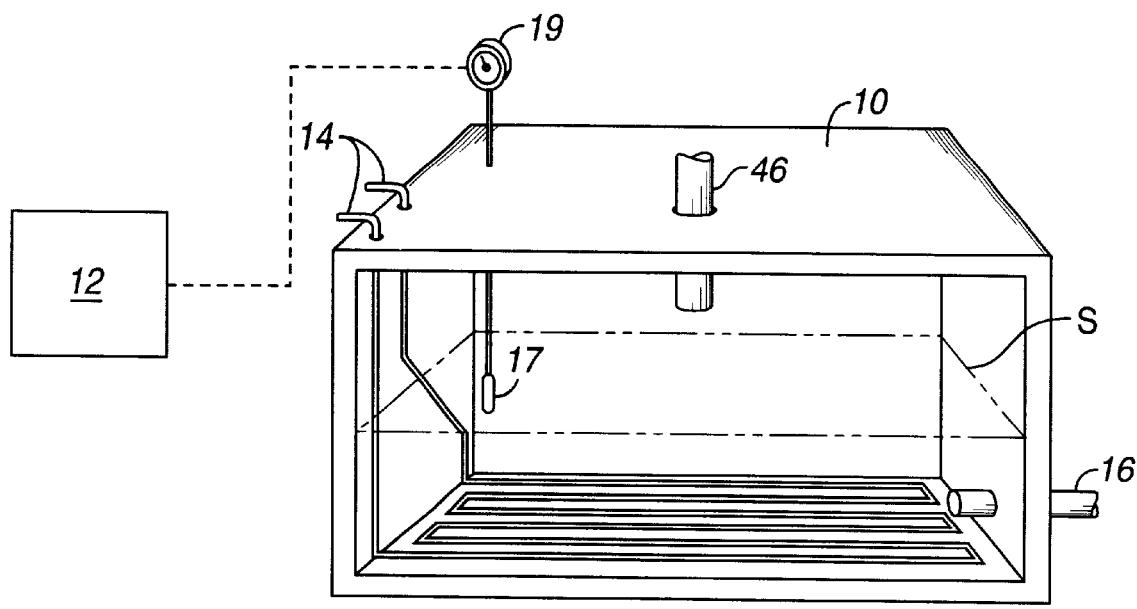
FIG. 4 is a perspective view of reservoir 10 cross sectioned along the front side to expose the inside of the reservoir.

A reservoir 10 is provided for holding a volume of liquid coolant intended for circulation through the system. As will be apparent to those skilled in the art of coolant systems, there are myriad coolant compositions that can be used with the present invention. For instance, I have found success using conventional automobile antifreezes having freezing temperatures of −30° C. and below. In FIG. 4, the surface level of the coolant is denoted by the letter S. Preferably, the reservoir has an insulated construction for maintaining the desired coolant temperature during operation. For example, conventional recreational coolers, such as those sold under the trade name IGLOO, provide adequate insulation. The size requirements of the reservoir can vary depending upon the circulation requirements of the particular system.

A conventional compressor subsystem 12 is provided for reducing, and subsequently maintaining, the temperature of the coolant within a desired temperature range. Compressor systems such as that employed in the present invention are commonly used in automobile air conditioning systems and refrigeration systems. Accordingly, a detailed description of the compressor system is not necessary to practice the present invention and is not provided. Generally, a refrigerant such as that sold under the trade name FREON, is compressed and circulated through a length of copper piping. As illustrated in FIG. 4, in the present invention, compressed refrigerant is circulated through a length of copper tubing 14 which includes a section extending proximate to the bottom of coolant reservoir 10. Although the section of copper tubing extending along the bottom of the reservoir is illustrated running in a serpentine pattern, this feature of the invention is not intended to be limiting. For example, the section of copper tubing extending along the bottom of coolant reservoir 10 can have a coil-shaped pattern. As a result of maintaining the main section of copper tubing near the bottom of the reservoir, there is a decreasing coolant temperature gradient from the surface, S, of the coolant toward the bottom of the reservoir.

A pump 18 is provided for maintaining the circulation of liquid coolant through the system during operation. It will be apparent to those skilled in the art that a variety of different pump types and sizes can be employed with the present invention. I have found success using a 115 VAC, single phase, 60 Hz thermally-protected pump (catalog no. R106) manufactured by Water Ace Pump Co. of Ashland, Ohio.

As will now be described in more detail, a conduit subassembly is provided for directing the flow of coolant through the system. Generally, the conduit subassembly includes an inlet manifold 20, a plurality of inlet conduit members 24, an outlet manifold 44, and a plurality of outlet conduit members 40.

Inlet manifold 20 is preferably manufactured from a durable thermally insulating polymer such as polyvinyl chloride (PVC) and includes a plurality of integral manifold ports 22 fluidly connected to the inlet conduit members 24.

Preferably, inlet conduit members 24 comprise lengths of flexible plastic tubing capable of circulating coolant at the desired operational temperatures without degrading. For instance, the preferred tubing should be capable of circulating coolant at temperatures of about −20° C. to about −40° C., without degrading. It will be apparent to those skilled in the art that there are numerous commercially available flexible tubing materials that can be employed for this purpose. Opposite ends of each inlet conduit member 24 fit snugly over integral port 22 and fluid connector portion 29, respectively. A conventional clamp member (not shown) can be used to further secure the ends of each inlet conduit member to the respective inlet ports and fluid connectors.

Outlet manifold member 44 has a similar construction to inlet manifold member 20 and includes a plurality of integral outlet ports 42 attached by outlet conduit members 40 to corresponding fluid connectors as previously described above. Preferably, the outlet conduit members 40 are provided having a smaller inner diameter than the respective inlet conduit members 24. Consequently, the rate at which a volume of liquid coolant enters each glass tube member 30 is greater than the rate at which the same volume of liquid coolant exits the glass tube member. In this manner, the glass members are maintained continuously filled with coolant during operation to eliminate the occurrence of bare spots, or external surface areas not coated with ice, during operation. Outlet manifold member 44 has an integral return port 46 through which the coolant is returned to coolant reservoir 10. As illustrated in FIGS. 1 and 4, return port 46 introduces circulated coolant back to the surface, S, of the coolant volume in reservoir 10.

In an alternate embodiment of the present invention, a thermocouple apparatus extends through reservoir 10 for measuring the coolant temperature. More specifically, the thermocouple includes a temperature sensor 17 and a temperature display 19. Preferably, the thermocouple also communicates electronically with the compressor subsystem 12 in such a manner that operation of the compressor can be regulated to maintain the coolant temperature within a desired range.

The operation of the system of the present invention will now be described in more detail. As previously described, the system can be operated to form an ice coating on the exterior of a glass article 30, as well as to prevent the formation of such an ice coating.

In the former case, where the system is operated to form an ice coating, the compressor subsystem initially reduces the temperature of liquid coolant in the reservoir 10 to a desired temperature or temperature range. The desired coolant temperature can vary depending upon a number of factors including, but not limited to, the ambient conditions and the number and size of glass members to be ice coated. However, for a given system the rate of formation of the ice coating increases as the temperature of the circulated coolant is decreased. Generally, the temperature of the circulated coolant is maintained in the range of about −10° C. to about −40° C., and preferably at a temperature below about −20° C.

Once the desired coolant temperature has been achieved, coolant is pumped out of reservoir 10 and into inlet manifold 20. Subsequently, the coolant is forced through integral manifold ports 22 and directed into corresponding glass members 30. Upon exiting the glass members, coolant is recombined in outlet manifold 44, where it is returned into reservoir 10 through outlet port 46. As the coolant is circulated through the system, condensate forms on the outer surface of the glass members, ultimately freezing to form the desired ice coating.

During circulation through the system the coolant temperature increases. Preferably, this warmed coolant is returned to the surface of the body of coolant in the reservoir such that the volume of coolant in the reservoir has a decreasing temperature gradient from the surface toward the bottom. By drawing coolant from the bottom of the reservoir, the temperature of the returned coolant is gradually decreased to the desired temperature before being re-circulated through the glass tube members 30.

Alternatively, in some instances it may be desirable to prevent the formation of an ice coating on the exterior of the glass members 30 under below freezing ambient conditions. In that instance, the system is operated in much the same manner as previously described, with the exception that the coolant is preferably circulated through the system at a temperature sufficient to preclude the formation of said ice coating.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims. For example, although the glass members 30 are illustrated attached to a support member surface 36 having a horizontal plane, other orientations are possible. In particular, the flexibility of conduit members 24 and 40 enable support surface 36 to be rotated to any desired orientation. For example, support surface 36 can have a vertical orientation where the artwork is displayed extending outwardly from a wall.

I claim:

1. A system for controlling the formation of an ice coating on the outer surface of a hollow glass member of an artwork, comprising:

a support surface having at least two apertures extending therethrough;

at least one tubular glass member having opposite open ends attached to said support surface, said opposite open ends each positioned over one of said at least two apertures;

a volume of fluid;

a cooling means for reducing the temperature of said fluid to a temperature within a target temperature range; and a circulation means for flowing said fluid through said at least one tubular glass member, whereby the circulation of said fluid results in the formation of an ice coating on the outer surface of said at least one tubular glass member.

2. A system as recited in claim 1, wherein said fluid comprises a liquid coolant.

3. A system as recited in claim 1, wherein said cooling means comprises a compressor.

4. A system as recited in claim 1, wherein the opposite open ends of said at least one tubular glass member are attached to said support surface using a chemical adhesive.

5. A system as recited in claim 2, further comprising a thermally-insulated reservoir for holding said volume of liquid coolant.

6. A system as recited in claim 5, wherein said system includes a plurality of said tubular glass members attached to said support surface, said circulation means further comprising:

an inlet manifold subassembly for directing said liquid coolant into individual tubular glass members;

an outlet manifold subassembly for returning coolant exiting said individual glass members into said thermally-insulated reservoir; and a pump fluidly connecting said thermally-insulated reservoir and said inlet manifold, said pump effecting the flow of coolant from said reservoir toward said inlet manifold and maintaining circulation of said coolant through said system.

7. A system as recited in claim 6, further comprising a means for maintaining the temperature of said coolant within said target temperature range.

8. A system as recited in claim 7, wherein said coolant temperature maintaining means comprises a temperature detection device in communication with said cooling means.

9. A method for forming an ice-coated glass art work, comprising the steps of:

providing at least one open-ended hollow glass member;

coupling opposite ends of said glass member to a fluid circulation system;

reducing the temperature of said fluid to a target temperature range; and flowing said fluid through said at least one glass member to form an ice coating on the outer surface thereof.

10. A method as recited in claim 9, wherein the step of providing at least one open-ended hollow glass member further comprises blowing molten glass to form said at least one open-ended tubular glass member.

11. A method as recited in claim 9, wherein the step of coupling further comprises coupling opposite ends of said hollow glass member to a liquid coolant circulation system.

12. A method as recited in claim 9, wherein the step of reducing the temperature of said fluid further comprises reducing the temperature of said fluid to a temperature within a range of about −10° C. to about −40° C.

13. A method as recited in claim 9, wherein the step of reducing the temperature of said fluid further comprises reducing the temperature of said fluid to a temperature below about −20° C.

* * * * *